US008545704B2

(12) United States Patent
Rhee et al.

(10) Patent No.: US 8,545,704 B2
(45) Date of Patent: Oct. 1, 2013

(54) METHOD FOR RECOVERING AMINE FROM AMINE-CONTAINING WASTE WATER

(75) Inventors: In H. Rhee, Chungcheongnam-do (KR); Byung G. Park, Chungcheongnam-do (KR); Hyun J. Jung, Gyeonggi-do (KR)

(73) Assignee: Soonchunhyang University Industry Academy Cooperation Foundation, Chungcheongnam-do (KR)

( * ) Notice: Subject to any disclaimer, the term of this patent is extended or adjusted under 35 U.S.C. 154(b) by 303 days.

(21) Appl. No.: 12/994,637

(22) PCT Filed: May 30, 2008

(86) PCT No.: PCT/KR2008/003037
§ 371 (c)(1),
(2), (4) Date: Dec. 30, 2010

(87) PCT Pub. No.: WO2009/145372
PCT Pub. Date: Dec. 3, 2009

(65) Prior Publication Data
US 2011/0100917 A1     May 5, 2011

(30) Foreign Application Priority Data
May 28, 2008    (KR) ........................ 10-2008-0049602

(51) Int. Cl.
*C02F 1/58*         (2006.01)
(52) U.S. Cl.
USPC ........... 210/662; 210/664; 210/672; 210/681; 210/692; 210/743; 210/746; 210/903; 203/3; 203/14; 203/40; 203/41; 203/91
(58) Field of Classification Search
USPC ................ 210/660, 662, 664, 672, 681, 692, 210/743, 746, 903, 188, 436, 472; 203/1, 203/3, 39, 41, 91, 14, 40
See application file for complete search history.

(56) References Cited

U.S. PATENT DOCUMENTS 3,453,183 A * 7/1969 Okubo et al. .................. 203/33
3,839,159 A * 10/1974 Dunnavant et al. ........... 376/308

(Continued)

FOREIGN PATENT DOCUMENTS

JP    52-071861 A    6/1977
JP    58-030387 U    2/1983

(Continued)

OTHER PUBLICATIONS

Korean Patent Office, Machine translation of KR 10-0722942, eight pages.*

(Continued)

*Primary Examiner* — Matthew O Savage
(74) *Attorney, Agent, or Firm* — Marshall, Gerstein & Borun LLP

(57) ABSTRACT

Provided is a method for recovering high-concentration and high-purity amine from amine-containing waste water generated from nuclear power plants and thermal power plants. The method includes: capturing amine and concentrating waste water using a cation exchange resin; separating amine from the concentrated amine-containing waste water; and carrying out further separation of amine via distillation. The method may be applied to treat amine, which causes an increase in biochemical oxygen demand (BOD) and total nitrogen concentration, drastically at the time of its generation from waste water of nuclear power plants and thermal power plants. In this manner, the method may prevent an increase in load of existing waste water treating plants and avoid a need for modifying the equipment in the existing plants. In addition, the method disclosed herein may allow recovery and reutilization of amine, injected continuously to prevent corrosion of water/vapor circulation systems of nuclear power plants and thermal power plants, thereby improving the cost-efficiency in such power plants.

14 Claims, 2 Drawing Sheets

(56) References Cited

U.S. PATENT DOCUMENTS

| | | | |
|---|---|---|---|
| 3,975,241 A * | 8/1976 | Smith | 202/202 |
| 4,263,145 A * | 4/1981 | Wirth, Jr. | 210/675 |
| 5,043,075 A * | 8/1991 | Dietmar et al. | 210/664 |
| 5,762,897 A * | 6/1998 | Chang et al. | 423/387 |
| 6,123,850 A | 9/2000 | Commarieu et al. | |
| 6,582,563 B1 * | 6/2003 | Adam et al. | 202/83 |
| 6,800,257 B1 * | 10/2004 | Kuriyama et al. | 422/186.3 |

FOREIGN PATENT DOCUMENTS

| | | |
|---|---|---|
| JP | 05115884 A | 5/1993 |
| JP | 05-294902 A | 11/1993 |
| JP | 06-126196 A | 5/1994 |
| JP | 08-150389 A | 6/1996 |
| JP | 03-030892 U | 11/1996 |
| JP | 08318263 A | 12/1996 |
| JP | 09-314128 | 12/1997 |
| JP | 09-314128 A | 12/1997 |
| JP | 10-316594 A | 12/1998 |
| JP | 2003-164859 A | 6/2003 |
| JP | 2003-236528 A | 8/2003 |
| JP | 2005-066544 A | 3/2005 |
| JP | 2007-241277 A | 9/2007 |
| JP | 2007-241278 A | 9/2007 |
| JP | 2007-268397 A | 10/2007 |
| KR | 10-0722942 B1 | 5/2007 |
| WO | WO-2008-013370 A1 | 1/2008 |

OTHER PUBLICATIONS

Written Opinion for PCT/KR2008/003037, dated Jan. 9, 2009.
International Search Report for PCT/KR2008/003037, dated Jan. 9, 2009.

* cited by examiner

METHOD FOR RECOVERING AMINE FROM AMINE-CONTAINING WASTE WATER

TECHNICAL FIELD

This disclosure relates to a method for recovering high-concentration and high-purity amine from amine-containing waste water generated from nuclear power plants and thermal power plants. More particularly, this disclosure relates to a method for recovering amine, including: capturing amine and concentrating waste water using a cation exchange resin; separating amine from the concentrated amine-containing waste water; and carrying out further separation of amine via distillation.

BACKGROUND ART

Nuclear power plants and thermal power plants use water as an energy transfer medium to obtain electric energy from nuclear power energy or fossil fuels. In general, water/vapor circulation systems in power plants include vaporizing water to rotate turbines and generate electricity, and condensing the vapor back into water for recirculation.

At that time, various parts of such systems may be corroded and damaged by the water. Thus, some chemicals, such as pH adjusting agents and chemical potential adjusting agents, may be added to inhibit corrosion of various metals electrochemically.

The water/vapor circulation systems of nuclear power plants and thermal power plants are provided with ion exchange resin towers, and thus not only a trace amount of impurities but also such chemicals added for inhibiting corrosion are removed. Therefore, it is required to remove the chemicals from the ion exchange resin and inject them back to the ion exchange resin from an external source in every water/vapor circulation cycle.

Since some of the above mentioned chemicals are highly volatile materials that are emitted to the air during their treatment, they may be easily treated by a simple physical process. However, other chemicals may exist in water to cause an increase in biochemical oxygen demand (BOD) and total nitrogen concentration specified by environmentally permissible emission standards. In this case, it is not possible to satisfy standards for effluents.

DISCLOSURE

Technical Problem

Provided is a method for recovering and recycling high-concentration and high-purity amine from amine-containing waste water discharged from nuclear power plants and thermal power plants, while preventing emission of amine and enhancing industrial applicability of amine in wastewater.

Technical Solution

In one aspect, there is provided a method for recovering amine from amine-containing waste water, including: (S10) carrying out concentration of waste water by capturing amine from amine-containing waste water with a cation exchange resin and eluting the amine captured in the cation exchange resin; (S20) carrying out separation of amine from the concentrated amine-containing waste water; and (S30) carrying out further separation of amine by performing distillation of the amine-containing waste water remaining after the separation of amine at a temperature of 150° C. or lower under a pressure of 100 mmHg or lower.

In another aspect, there is provided a method for recovering amine from amine-containing waste water, including: introducing amine-containing water into an ion exchange resin tower (10) packed with a cation exchange resin (11) to capture amine from the amine-containing waste water, and eluting the amine captured in the cation exchange resin to concentrate the waste water; separating amine from the concentrated amine-containing waste water using a pH meter (7) and a conductivity meter (8); and heating the amine-containing waste water remaining after the separation of amine in an evaporation tower (14) at a temperature of 150° C. or lower under a pressure of 100 mmHg or lower, and cooling vapor generated from the evaporation tower in a cooling tower (16) to a temperature of 25° C. or lower to carry out further separation of amine.

Advantageous Effects

The method for recovering amine disclosed herein may be applied to treat amine, which causes an increase in biochemical oxygen demand (BOD) and total nitrogen concentration, drastically at the time of its generation from waste water of nuclear power plants and thermal power plants. In this manner, the method may prevent an increase in load of existing waste water treating plants and avoid a need for modifying the equipment in the existing plants. In addition, the method disclosed herein may allow recovery and reutilization of amine, injected continuously to prevent corrosion of water/vapor circulation systems of nuclear power plants and thermal power plants, thereby improving the cost-efficiency in such power plants.

DESCRIPTION OF DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

Figure 1:
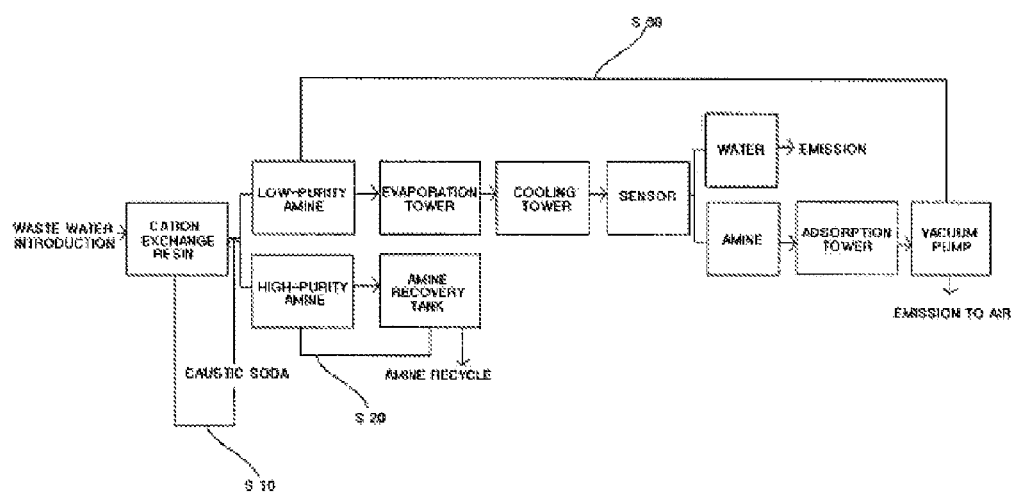
FIG. 1 is a flow chart illustrating the method for recovering amine according to one embodiment.

1: pump
2: amine-containing waste water tank
3: caustic soda tank
4: pure water
5: air
6: adsorption tower
7: pH meter
8: conductivity meter
9: adsorption tower
10: ion exchange resin tower
11: cation exchange resin
12: amine recovery tank
13: low-purity amine storage tank
14: evaporation tower
15: gas/liquid, gas/solid separator
16: cooling tower
17: vacuum pump

BEST MODE

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

In one aspect, there is provided a method for recovering amine from amine-containing waste water, including: (S10) carrying out concentration of waste water by capturing amine from amine-containing waste water with a cation exchange resin and eluting the amine captured in the cation exchange resin; (S20) carrying out separation of amine from the concentrated amine-containing waste water; and (S30) carrying out further separation of amine by performing distillation of the amine-containing waste water remaining after the separation of amine at a temperature of 150° C. or lower under a pressure of 100 mmHg or lower.

FIG. 1 is a flow chart illustrating the method for recovering amine according to one embodiment. First, amine is captured from amine-containing waste water using a cation exchange resin, and the amine captured in the cation exchange resin is eluted to concentrate waste water (S10). The elution of amine may be carried out by injecting caustic soda into the cation exchange resin in which the amine is captured. During the elution, water, amine and caustic soda are discharged in turn.

Next, high-purity amine is separated from the concentrated amine-containing waste water using pH and conductivity (S20). Herein, amine has a pH value of 8-12 and a conductivity value of 0.01-4 ms/cm. High-purity amine separated herein may be stored in an amine recovery tank so that it may be reutilized.

The low-purity amine-containing waste water remaining after the separation of the high-purity amine is transferred to an evaporation tower, heated and evaporated at a temperature of 150° C. or lower under a pressure of 100 mmHg or lower, and then cooled and condensed in a cooling tower to a temperature of 25° C. or lower. In this manner, amine is further separated from the waste water (S30). The pressure of 100 mmHg or lower may be provided using a vacuum pump. Heating at the pressure of 100 mmHg or lower may allow a decrease in evaporation temperature, thereby reducing heat energy and electric energy. The waste water is heated at a temperature of 150° C. or lower so that only pure water and amine may be evaporated without evaporation of any impurities.

After the vapor is condensed in the cooling tower as described above, water and amine may be separated from each other using a sensor. The sensor measures pH and conductivity. Water and amine may be separated from each other, since water has a pH value of 7 or less and a conductivity value less than 10 μs/cm, while amine has a pH value of 8 or higher and a conductivity value of 10 μs/cm or higher. Gaseous amine partially re-evaporating after the condensation may be adsorbed on an adsorbent, and the vapor, from which the gaseous amine is removed, may be discharged into the air. The vacuum pump may be installed in the downstream of the adsorption tower. Thus, it is possible to prevent a heavy load on the vacuum pump and contamination of the adsorption tower caused by oil of the vacuum pump.

Mode for Invention

The examples will now be described. The following examples are for illustrative purposes only and not intended to limit the scope of this disclosure.

Figure 2:
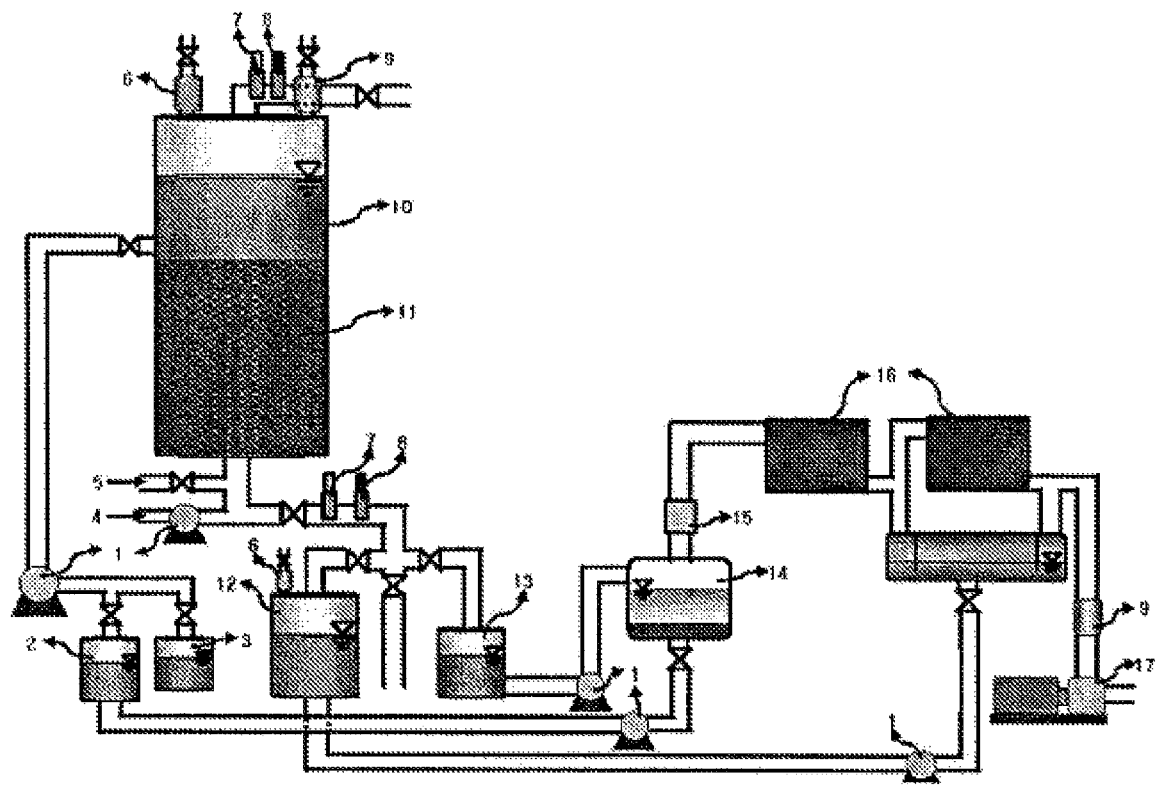
FIG. 2 is a schematic view illustrating the system to which the method for recovering amine according to one embodiment is applied.

The method for recovering amine according to one embodiment may be carried out through the system as shown in FIG. 2.

First, amine-containing waste water stored in an amine-containing waste water tank (2) is introduced into an ion exchange resin tower (10) packed with a cation exchange resin (11) using a chemical pump (1). The amine contained in the waste water is captured by the cation exchange resin. After that, caustic soda solution is injected to the ion exchange resin tower (10) from a caustic soda tank (3) linked thereto, so that the amine captured in the resin is eluted to produce an eluate stream.

The ion exchange resin tower (10) may be formed of a polymeric material or a metal, such as stainless steel, which causes no corrosion under strong basic environment. The cation exchange resin (11) may include a resin having a divinyl benzene-styrene copolymer as a backbone and containing a sulfonate group (—$SO_3H$) as an exchange group. When the cation exchange resin (11) loses its exchange capacity, a caustic soda solution may be injected into the ion exchange resin tower (10) to perform elution of the amine captured in the cation exchange resin, thereby regenerating the cation exchange resin (11).

Through the elution process, the initially introduced amine-containing waste water is highly concentrated to a ratio of about 1/10,000 to 1/20,000 and the volume of waste water is decreased.

In addition, an adsorption tower (6) packed with caustic soda and active carbon is linked to the top of the ion exchange resin tower (10) to prevent introduction of external carbon dioxide. Further, another adsorption tower (9) packed with zeolite is linked to prevent leakage of the internal gaseous amine. In general, zeolite has fine interstitial volumes in its crystal structure and chemical substances may be bound chemically or physically to the interstitial volumes. In this manner, the gaseous amine may be adsorbed on zeolite.

The eluate stream is passed through a pH meter (7) and a conductivity meter (8) to sense the pH and conductivity of the eluate stream. The eluate stream is diverted using valves such that a high-purity amine is stored in an amine recovery tank (12) when a pH value of 8 or higher and a conductivity value of 10 μs/cm or higher indicative of a high purity amine is sensed by the pH meter and conductivity meter. An adsorption tower (6) packed with caustic soda and active carbon is linked to the top of the amine recovery tank (12) to prevent introduction of external carbon dioxide.

The eluate stream is diverted using valves such that a low purity amine is temporarily stored in a low-purity amine storage tank (13) when the eluate has a pH value not equal to 8-12 and a conductivity not equal to 0.01-4 μs/cm indicative of a low purity amine is sensed by the pH meter and conductivity meter. The low purity amine is transferred to an evaporation tower (14), in which the waste water is heated and evaporated at a temperature of 150° C. or lower under a pressure of 100 mmHg or lower. A gas stream generated by the evaporation are transferred to a cooling tower (16) where they are cooled and condensed to a temperature of 25° C. or lower to produce a condensate stream. In addition, a gas/liquid and gas/solid separator (15) is installed between the evaporation tower (14) and the cooling tower (16) to prevent the solid matters or non-vaporized organic substances present in the waste water from being carried over and entrained in the vapor and gaseous amine. Herein, the term 'carry-over' refers to a phenomenon in which non-volatile organic or inorganic substances are entrained in vapor or bubbles to be removed into the air when water containing the non-volatile organic or inorganic substances is boiled.

The evaporation tower (14) may be formed of such materials as stainless steel, aluminum or titanium, causing no corrosion under strong basic environment and having excellent heat conductivity. In addition, the cooling tower (16) may be formed of such metals as stainless steel or titanium containing no copper components, causing no corrosion under strong basic environment, having excellent heat conductivity. As a heat removing source of the cooling tower (16), air (5), pure water (4) or a coolant may be used.

As the vapors are condensed in the cooling tower (16), amine is further separated from impurities using a sensor, the condensate stream is diverted using valves such that a high purity amine is stored in an amine recovery tank (12) when the condensate stream has a pH value of 8 or higher and a conductivity value of 10 μs/cm or higher. The gaseous amine remaining after the separation of the condensed amine may be adsorbed on the adsorbent inside the adsorption tower (9) linked to the cooling tower (16). The condensate stream is diverted to a water emission area when the liquid stream has a pH value of 7 or lower and a conductivity value less than 10 μ/cm.

As can be seen from the foregoing, the method for recovering amine disclosed herein allows drastic and effective recovery of amine at the time of regenerating an ion exchange resin, in which amine is generated from amine-containing waste water. Therefore, the method disclosed herein allows effluents to satisfy standards for effluent and permissible emission standards, particularly in terms of biochemical oxygen demand (BOD) and total nitrogen content. In addition, the method disclosed herein enables recovery of highly valuable amine.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. A method for recovering amine from amine-containing waste water, comprising:
    capturing amine from amine-containing waste water with cation exchange resins;
    eluting the amine captured in the cation exchange resin (S10) to produce an eluate stream;
    sensing a pH value and a conductivity value of the eluate stream;
    diverting the eluate stream to an amine recovery tank (12) when the eluate stream has a pH value of 8-12 and a conductivity value of 0.01-4 μs/cm indicative of a high purity amine;
    diverting the eluate stream to a low purity amine storage tank (13) when the eluate has a pH value not equal to 8-12 and a conductivity not equal to 0.01-4 μs/cm indicative of a low purity amine;
    performing distillation of the low purity amine stream at a temperature of 150° C. or lower under a pressure of 100 mmHg or lower (S30) to produce a gas stream;
    condensing the gas stream to produce a condensate stream;
    sensing a pH value and a conductivity value of the condensate stream;
    diverting the condensate stream to the amine recovery tank (12) when the condensate stream has a pH value of 8 or higher and a conductivity value of 10 μs/cm or higher indicative of a high purity amine; and
    diverting the condensate stream to a water emission area when the condensate stream has a pH value of 7 or lower and a conductivity value less than 10 μs/cm indicative of water.

2. The method for recovering amine from amine-containing waste water according to claim 1, wherein the amine is eluted by injecting caustic soda to the cation exchange resin in which the amine is captured.

3. The method for recovering amine from amine-containing waste water according to claim 1, wherein gaseous amine remaining after the condensing step is adsorbed using adsorbents.

4. The method for recovering amine from amine-containing waste water according to claim 1, wherein the pressure of 100 mmHg or lower is provided using a vacuum pump.

5. A method for recovering amine from amine-containing waste water, which comprises:
    introducing amine-containing waste water into an ion exchange resin tower (10) packed with cation exchange resins (11) to capture amine from the amine-containing waste water;
    eluting the amine captured in the cation exchange resin to produce an eluate stream;
    diverting the eluate stream in to an amine recovery tank or a low purity amine storage tank based on pH and conductivity measurements of the eluate stream using a pH meter (7) and a conductivity meter (8);
    heating the low purity amine stream in an evaporation tower (14) at a temperature of 150° C. or lower under a pressure of 100 mmHg or lower to produce a gas stream;

cooling the gas stream generated from the evaporation tower in a cooling tower (16) to produce a condensate stream containing amine and water;

sensing the pH and conductivity of the condensate stream;

diverting the condensate stream to the amine recovery tank when the condensate stream has a pH value of 8 or higher and a conductivity value of 10 μs/cm or higher; and diverting the condensate stream to a water emission area when the condensate stream has a pH value of 7 or lower and a conductivity value less than 10 μ/cm.

6. The method for recovering amine from amine-containing waste water according to claim 5, wherein the amine is eluted by injecting a caustic soda solution to the ion exchange resin tower (10) from a caustic soda tank (3) linked thereto.

7. The method for recovering amine from amine-containing waste water according to claim 5, wherein an adsorption tower (6) is linked to the top of the ion exchange resin tower (10) to prevent introduction of external carbon dioxide and an absorption tower (9) is linked to the top of the ion exchange tower to prevent leakage of internal gaseous amine.

8. The method for recovering amine from amine-containing waste water according to claim 7, wherein the adsorption tower provided for preventing leakage of gaseous amine is packed with zeolite.

9. The method for recovering amine from amine-containing waste water according to claim 7, wherein the adsorption tower provided for preventing introduction of external carbon dioxide is packed with caustic soda and active carbon.

10. The method for recovering amine from amine-containing waste water according to claim 5, wherein the eluate stream is diverted to the high purity amine stream when the eluate stream has a pH value of 8-12 and a conductivity value of 0.01-4 ms/cm.

11. The method for recovering amine from amine-containing waste water according to claim 5, wherein a gas/liquid and gas/solid separator (15) is provided between the evaporation tower (14) and the cooling tower (16) to prevent solid matters present in the waste water from being carried over and entrained in vapor and gaseous amine.

12. The method for recovering amine from amine-containing waste water according to claim 11, wherein the cooling tower (16) is linked to an adsorption tower to prevent leakage of gaseous amine.

13. The method for recovering amine from amine-containing waste water according to claim 12, wherein the adsorption tower provided for preventing leakage of gaseous amine is packed with zeolite.

14. The method for recovering amine from amine-containing waste water according to claim 5, wherein the cation exchange resin (11) has a sulfonate group ($-SO_3H$) as an exchange group and contains a divinyl benzene-styrene copolymer as a backbone.

* * * * *

UNITED STATES PATENT AND TRADEMARK OFFICE
CERTIFICATE OF CORRECTION

PATENT NO.         : 8,545,704 B2
APPLICATION NO.    : 12/994637
DATED              : October 1, 2013
INVENTOR(S)        : In Hyoung Rhee et al.

Page 1 of 1

It is certified that error appears in the above-identified patent and that said Letters Patent is hereby corrected as shown below:

In the Claims

In Column 7, Line 11, in Claim 5, delete "10 µ/cm" and insert -- 10µs/cm --, therefore.

Signed and Sealed this
Twenty-sixth Day of May, 2015

Michelle K. Lee
*Director of the United States Patent and Trademark Office*